United States Patent [19]
Keane et al.

[11] 3,823,377
[45] July 9, 1974

[54] COMMUNICATION SYSTEMS

[75] Inventors: Patrick J. Keane, Iron Acton; Alan B. Moor, Reading; Michael J. Routley, Stoke Gifford, all of England

[73] Assignee: British Aircraft Corporation Limited, London, England

[22] Filed: Jan. 8, 1973

[21] Appl. No.: 321,798

[30] Foreign Application Priority Data

Jan. 11, 1972 Great Britain .................... 1294/72

[52] U.S. Cl. ...... 325/143, 179/15 AN, 179/15 AW, 331/78, 343/203

[51] Int. Cl. .......................................... H04b 1/04

[58] Field of Search..... 179/15 AN, 15 AW, 15 BA, 179/15 SY; 325/39, 41–43, 141, 143; 343/203; 331/78; 235/152

[56] References Cited

UNITED STATES PATENTS

| | | | |
|---|---|---|---|
| 3,208,008 | 9/1965 | Hills | 331/78 |
| 3,293,549 | 12/1966 | Patterson | 325/143 |
| 3,403,381 | 9/1968 | Haner | 179/15 BA |
| 3,492,587 | 1/1970 | Hutton | 235/152 |

*Primary Examiner*—Albert J. Mayer
*Assistant Examiner*—Marc E. Bookbinder
*Attorney, Agent, or Firm*—Kemon, Palmer & Estabrook

[57] ABSTRACT

A transmitter for use in a communication system in which successive frames of coded data are transmitted over a multi-channel link from a transmitting station to a receiving station includes a code generator for generating the successive frames of coded data and means for jittering the start of the successive frames of coded data such that the start of each frame is delayed by a random amount.

1 Claim, 4 Drawing Figures

COMMUNICATION SYSTEMS

This invention relates to communication systems, and in particular to a system using a pulse position modulation (PPM) encoder for transmitting coded signals over a multi-channel link from a transmitting station to a receiving station. A particular problem which occurs in systems of this kind is that of preventing mutual interference between the signals transmitted over different channels.

When using pulse position modulation to code a pulse carrier signal, the coded signal is normally divided into frames, each frame carrying a predetermined number of pulses. In accordance with the present invention a transmitter for use in a multi-channel communication link includes a code generator for generating successive frames of coded data, and means for jittering the start of the successive frames of coded data such that the start of each frame is delayed by a random amount.

In a preferred amount of the invention the jittering is responsive to the output of a random number generator. The random number generator includes a shift register which is intermittently connected to receive pulses from a free running clock pulse generator through an input gate, the gate being opened at fixed intervals so that the number of pulses allowed through the gate during each interval varies randomly in accordance with the frequency of the free running clock generator. At the end of each interval this random number output from the shift register is transferred to a down counter which produces a 'start' pulse for the next frame of the code generator after a time determined by the time taken to count down the output number.

Figure 1:
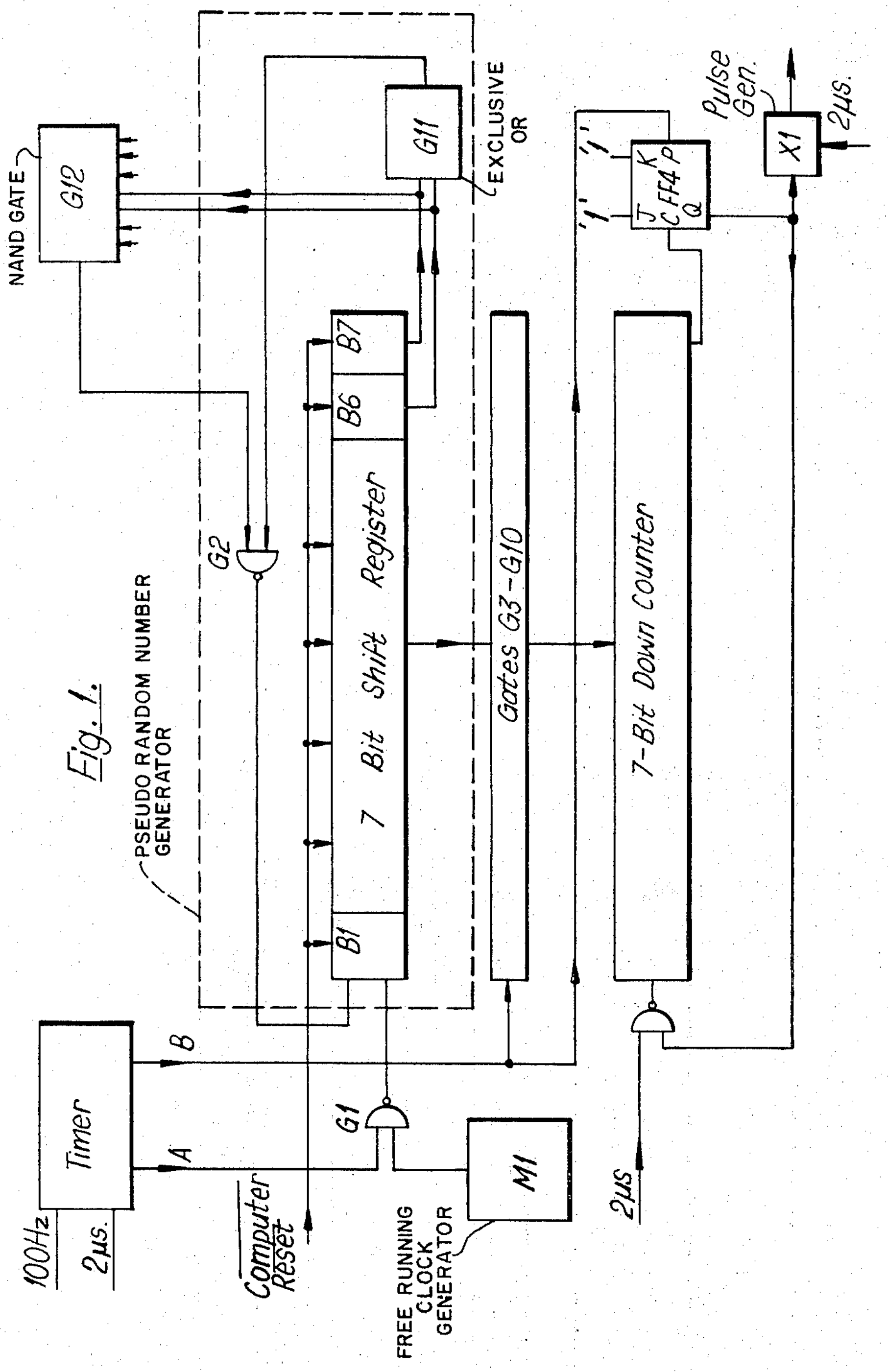
Figure 2:
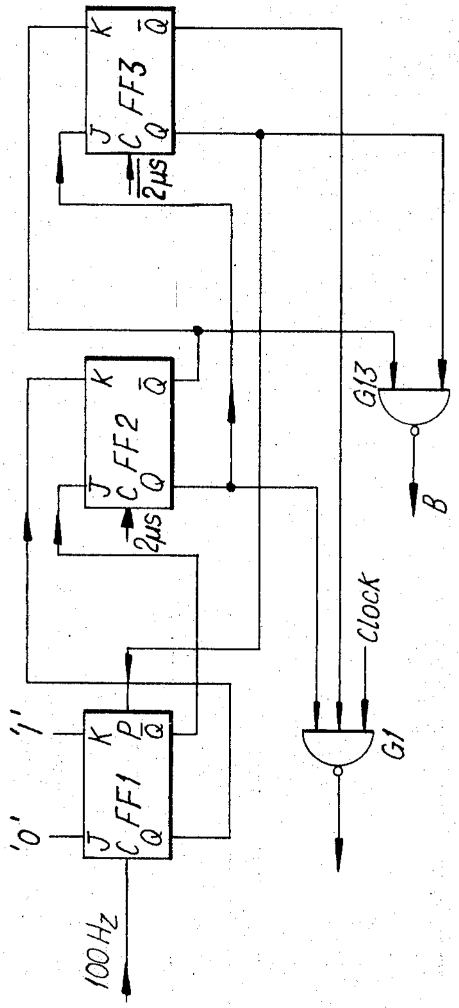
Figure 3:
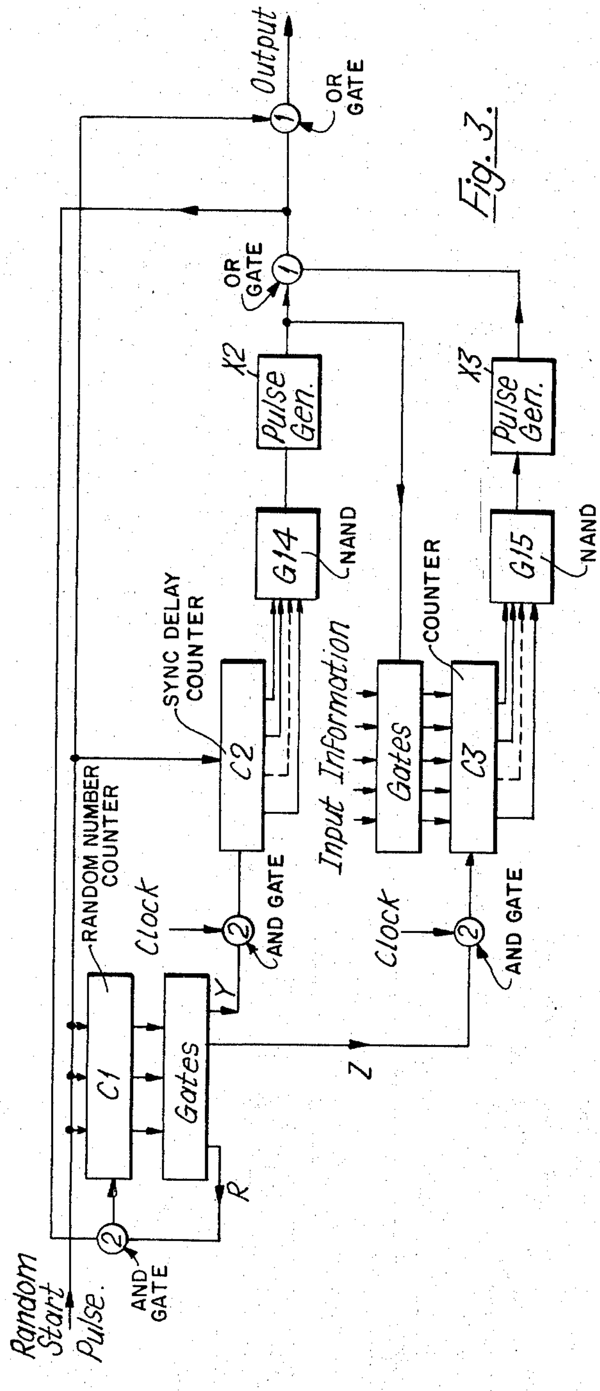
Figure 4:
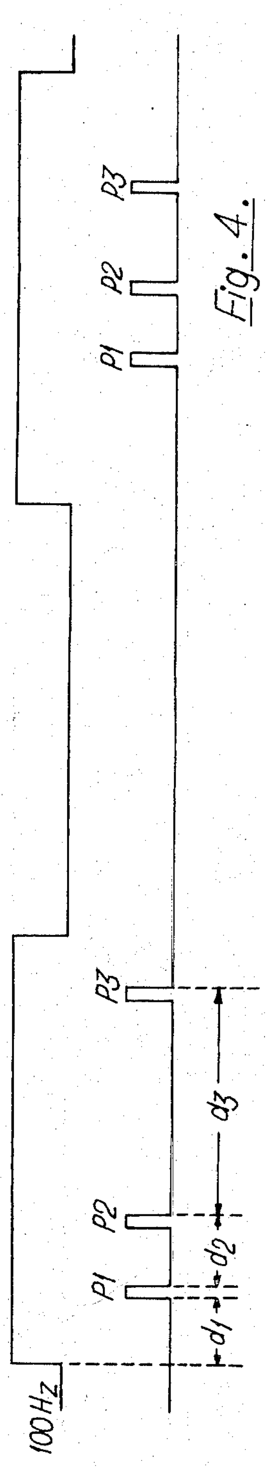

One example of the invention is shown in the accompanying drawing in which:

FIG. 1 is a block logic circuit diagram of a circuit for jittering the start of each frame of a code generator in a transmitter, FIG. 2 is a logic circuit diagram of the timer in FIG. 1, FIG. 3 is a block logic diagram of a simplified single channel PPM encoder, and FIG. 4 is a waveform diagram showing the 100 Hz timing waveform and the output of the PPM encoder.

The components enclosed within the dotted line of FIG. 1 form a standard pseudo random number generator. The last two bits B6, B7 of a 7-bit shift register are fed to an "exclusive OR" gate G11; if they are different then a "1" bit output is fed to one input of the two-input "NAND" gate G2 while if they are the same the output is a "0." The second input of the "NAND" gate G2 is connected to receive an output from a seven-input "NAND" gate G12, the seven inputs being connected to respective stages of the shift register. The output of G2 is fed back to the first stage of the register and prevents the register "locking up" into the "all zeros" state under fault conditions.

A 100 Hz square-wave input to a timer is combined with a 2 μs period square-wave input to provide a 2 μs pulse on line A every 100 mS, and a 1 μs pulse on line B, the leading edge of the 1 μs pulse occurring 4 μs after the leading edge of the 100 Hz signal. This is achieved using three J–K flip flops FF1, FF2, FF3 connected as shown in FIG. 2. Flip flop FF1 is clocked by the 100 Hz signal and its output is used to determine the state of FF2 which is clocked by the 2 μs signal. The output of FF2 determines the state of FF3 which is clocked by the inverse of the 2 μs signal. The output of FF3 presets FF1.

The 2 μs pulse on line A is sufficiently wide to allow three, four or five pulses of a free running clock generator M1 through an "AND" gate G1. Thus the shift register is clocked on 3, 4 or 5 times. The number of pulses allowed through the gate is variable because the phasing of the free running clock is changing with time compared with the 100 Hz signal.

At the end of the 2 μs pulse on line A, the 1 μs pulse on line B enables each of seven "AND" gates G3–G10 connected between respective stages of the 7-bit register and corresponding stages of a 7-bit down counter so that the random number stored in the 7-bit shift register is transferred into the 7-bit down counter. This number is then counted down to zero at which time a J-K flip flop FF4 connected to the final stage of the counter changes state. This transition is detected and the output of the flip flop FF4 is fed to a pulse generator which is driven by the 2 μs signal. The actual time at which each pulse is generated (as demanded by the 2 μs signal) is thereby varied by a random amount, each pulse being delayed until an output appears from the flip flop FF4.

The output pulses from the pulse generator comprise start pulses for successive frames of a PPM encoder such as that shown in FIG. 3. Since the start pulses are delayed by a random amount the start of each frame is jittered and, in a multi-channel encoder, this can considerably reduce the risk of mutual interference between the different channels. For simplicity only a single channel is shown in FIG. 3 but other channels can be added as required.

The individual frames of the coded signal are defined by the 100 Hz square-wave signal, the information pulses in each frame being preceded by a synchronisation delay. The encoder therefore generates three pulses in each frame, a first pulse defining the beginning of the synchronisation delay, a second pulse defining the end of the synchronisation period and the beginning of the information period, and a final pulse at the end of the information period. By delaying the start of the synchronisation period by a random amount the start of each frame is effectively jittered about a mean value.

The random start pulse from the pulse generator X1 resets a random number counter C1 to zero and also produces the first pulse output P1 defining the start of the sync period. It also sets a sync delay counter C2 to a predetermined number corresponding to the required sync delay.

The Y output from the gates connected to the counter C1 is then at a "1" and this allows clock pulses to count down the sync delay counter C2. A multi-input "NAND" gate G14 detects the state of all zeros in the counter C2 and a pulse generator X2 then generates the second pulse P2 defining the end of the sync period. This pulse is also used to clock the input information into the counter C3 and also to add one to the pulse number counter C1.

With a count of one in the pulse number counter C1, the Y-output goes to zero and the Z-output goes to a one. Clock pulses are thereby permitted access to the counter C3 which counts down until the state of all zeros is detected by the multi-input "NAND" gate G15. A third pulse generator X3 then generates the third pulse P3 which is fed to the output and also to the pulse number counter C1. With a count of two in the pulse counter C1 the R-output from the gates connected to the counter inhibits the entry of any further pulses into the counter C1. The encoder thus waits in this state until the next random start pulse appears which resets the counter C1 to zero and restarts the whole sequence.

We claim:

1. A transmitter including a code generator for generating successive frames of coded data, a timer for controlling the period of each frame such that each frame extends over a fixed time interval, each frame including an initial delay period during which coded data is not transmitted, a shift register, gating means responsive to the start of each frame generated by the timer for gating a random number of pulses into the shift register within the delay period, a counter for counting the random number of pulses entered into the shift register, and means responsive to the output of said counter for terminating the delay period such that the start of the coded data in each frame is delayed by a random amount.

* * * * *